(12) United States Patent
Mikitani et al.

(10) Patent No.: US 8,280,767 B1
(45) Date of Patent: Oct. 2, 2012

(54) LOTTERY SYSTEM UTILIZING ELECTRONIC MAIL

(75) Inventors: Hiroshi Mikitani, Tokyo (JP); Shinnosuke Honjo, Tokyo (JP); Tomomi Hatanou, Tokyo (JP)

(73) Assignee: Rakuten Inc., Tokyo (JP)

( * ) Notice: Subject to any disclaimer, the term of this patent is extended or adjusted under 35 U.S.C. 154(b) by 2342 days.

(21) Appl. No.: 09/653,163

(22) Filed: Sep. 1, 2000

(30) Foreign Application Priority Data

Sep. 1, 1999 (JP) .................................... 11-247300

(51) Int. Cl.
*G06Q 30/00* (2012.01)
*G06Q 10/00* (2012.01)
(52) U.S. Cl. ..................... 705/14.14; 705/1.1
(58) Field of Classification Search ............... 705/1, 7, 705/8, 10, 12, 14, 26, 27, 28, 35, 37, 1.1, 705/14.1, 14.12, 14.14, 14.23, 14.25, 14.36, 705/14.39; 463/16, 17, 18, 22, 42; 273/138.1, 273/139, 269; 379/93.13
See application file for complete search history.

(56) References Cited

U.S. PATENT DOCUMENTS

| | | | | |
|---|---|---|---|---|
| 5,794,219 A * | 8/1998 | Brown | ............................ | 705/26 |
| 5,937,391 A * | 8/1999 | Ikeda et al. | ...................... | 705/14 |
| 5,983,196 A * | 11/1999 | Wendkos | ........................ | 705/14 |
| 6,005,928 A * | 12/1999 | Johnson | ........................ | 379/142 |
| 6,024,641 A * | 2/2000 | Sarno | ................................ | 463/17 |
| 6,097,797 A * | 8/2000 | Oseto | ....................... | 379/100.08 |
| 6,102,797 A * | 8/2000 | Kail | ................................ | 463/16 |
| 6,193,605 B1 * | 2/2001 | Libby et al. | ..................... | 463/17 |
| 6,240,455 B1 * | 5/2001 | Kamasaka et al. | ............ | 709/229 |
| 6,297,819 B1 * | 10/2001 | Furst | .............................. | 715/733 |
| 6,409,593 B1 * | 6/2002 | Petrecca | ......................... | 705/14 |
| 6,442,686 B1 * | 8/2002 | McArdle et al. | .............. | 713/151 |
| 6,493,007 B1 * | 12/2002 | Pang | .............................. | 715/835 |
| 6,625,642 B1 * | 9/2003 | Naylor et al. | ................. | 709/206 |
| 6,915,332 B1 * | 7/2005 | Zdepski | ........................ | 709/206 |
| 7,054,830 B1 * | 5/2006 | Eggleston et al. | .............. | 705/14 |
| 7,058,593 B1 * | 6/2006 | Merritt | ........................... | 705/14 |

(Continued)

FOREIGN PATENT DOCUMENTS

JP 10-21303 1/1998

(Continued)

OTHER PUBLICATIONS

Toshie Kusano et al., "Japan-Wide Internet Service in Your Town," Nikkei Zero One, vol. 37, pp. 47-53, Nikkei Home Publication, (Jun. 1999).
Toshie Kusano et al., "Internet Inexpensive Use Technique," Nikkei Zero One, vol. 39, pp. 18-45, Nikkei Home Publication, (Aug. 1999).

*Primary Examiner* — Igor Borissov
(74) *Attorney, Agent, or Firm* — Rader, Fishman & Grauer PLLC

(57) ABSTRACT

A lottery system utilizing an electronic mail comprises means for specifying participants for a lottery from a database, means for uniquely allocating an electronic mail address to each of said specified participants so that said electronic mail addresses are different from each other; means for sending a first electronic mail to each of said participants, in which the electronic mail address is affixed as a unique access key to each of said participants; means for recognizing an application for the lottery from each of said participants by receiving a second electronic mail sent back to said electronic mail address; and means for notifying each one of said participants who sent back the second electronic mail to the electronic mail address of the result of said lottery.

20 Claims, 6 Drawing Sheets

U.S. PATENT DOCUMENTS

| | | | |
|---|---|---|---|
| 2001/0003100 A1* | 6/2001 | Yacenda | 463/41 |
| 2002/0161589 A1* | 10/2002 | Strandberg | 705/1 |
| 2004/0014514 A1* | 1/2004 | Yacenda | 463/17 |
| 2005/0111047 A1* | 5/2005 | Rhoads | 358/3.28 |

FOREIGN PATENT DOCUMENTS

| | | |
|---|---|---|
| JP | 10-257185 | 9/1998 |
| JP | 10-312427 | 11/1998 |

* cited by examiner

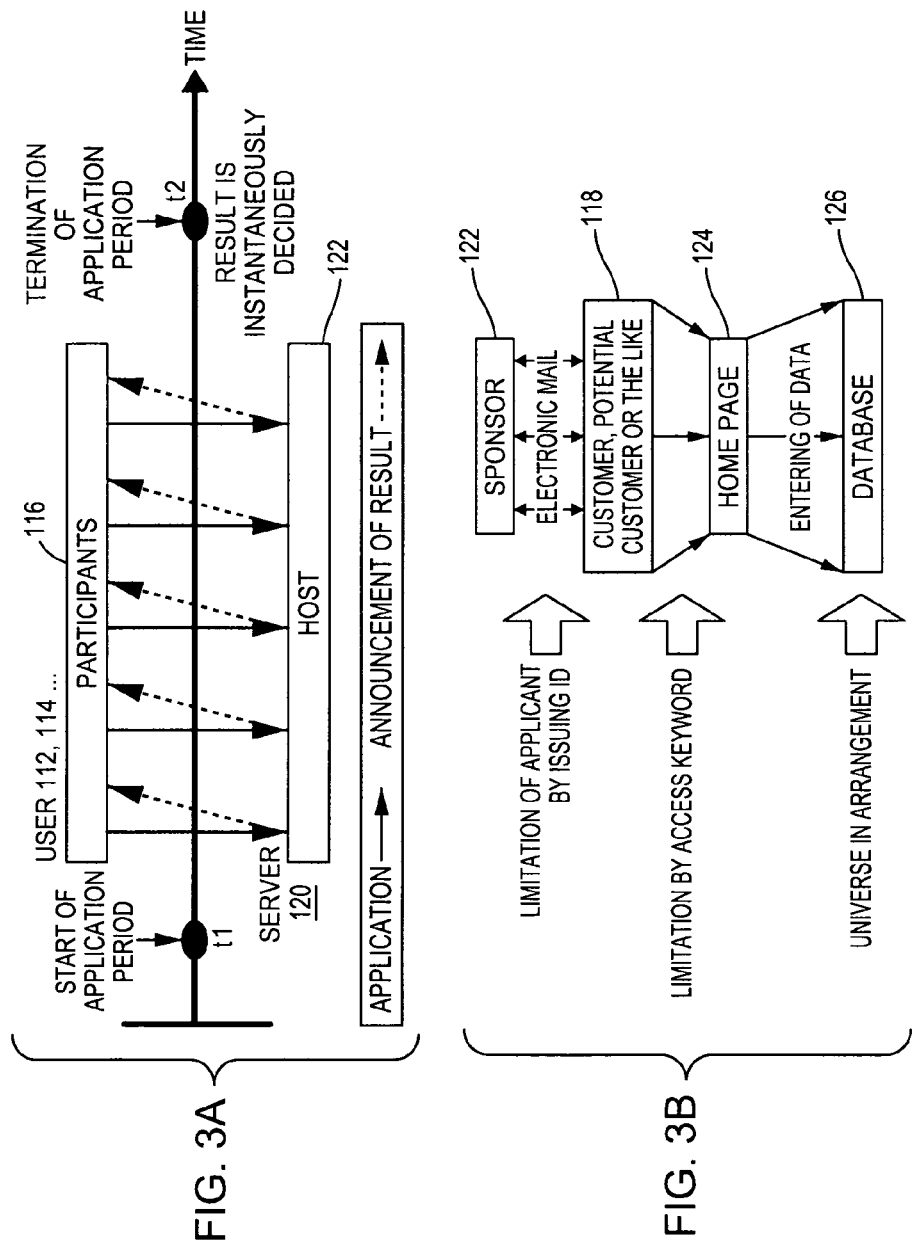

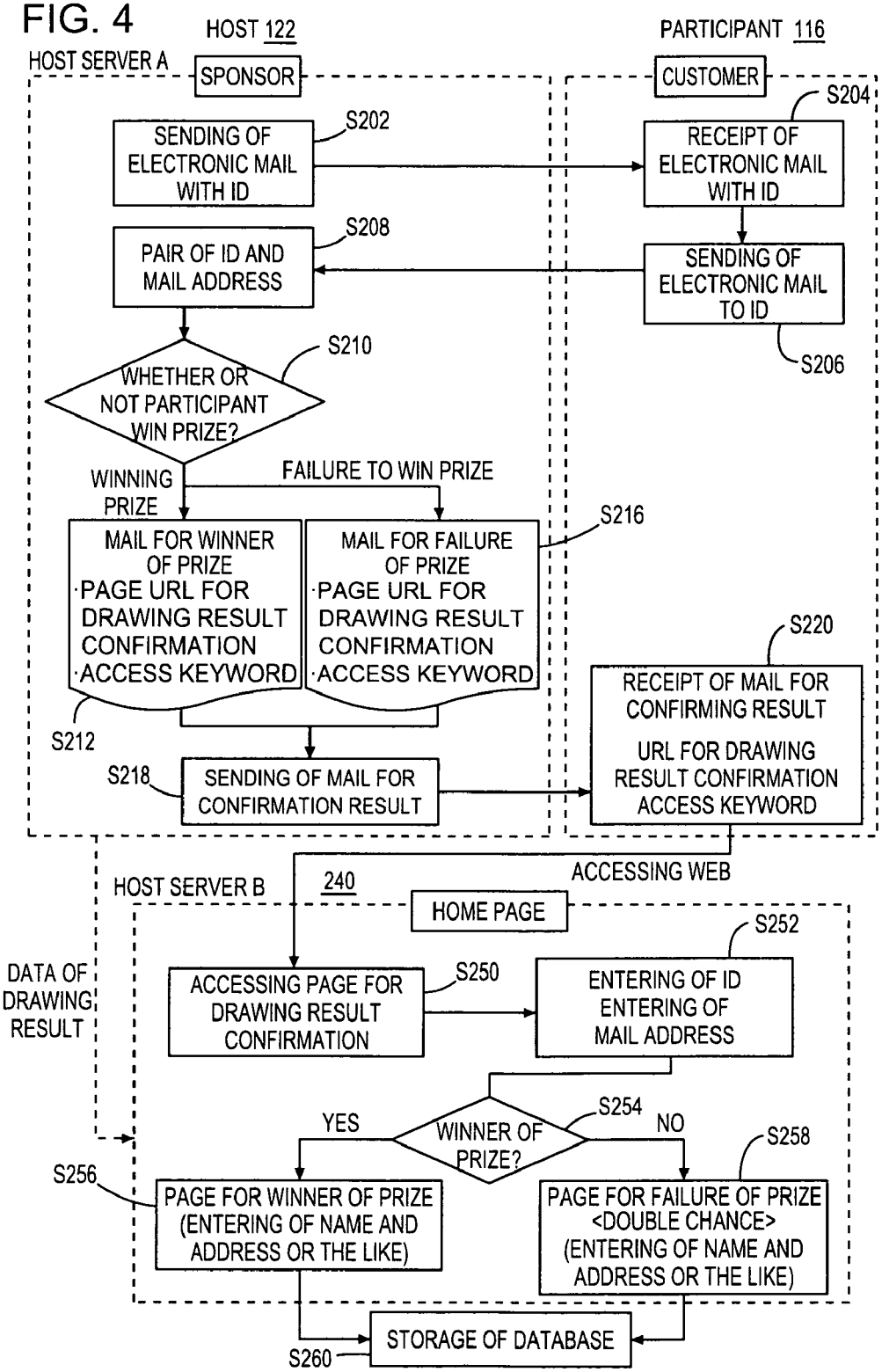

LOTTERY SYSTEM UTILIZING ELECTRONIC MAIL

BACKGROUND OF THE INVENTION

The present invention relates to a lottery system utilizing an electronic mail, more particularly to a lottery system in which the results of the lottery system is interactively identifiable.

Recently, varieties of services have been provided on the Internet. FIG. 1 shows one diagram of a configuration of the present invention using the Internet. A plurality of users 112 and 114 may access to a server 120 connected to the Internet 101 by, for example, a browser. Thus the users 112, 114 may utilize services provided by the server 120. One of the services available in the Internet is a lottery service wherein prizes are awarded to winners by a host server 122. Explanatory diagrams for this service are shown in FIGS. 2A and 2B.

With reference to a conventional prize competition using the Internet, a certain period of time was needed until the result of lottery was known after application by the participants 116. A conventional lottery system using the Internet is explained in FIG. 2A. The prize competition of the lottery system is not limited to the one on the Internet. However, the prizes are generally awarded to a predetermined number of winners chosen among participants 116 who had applied for a lottery for a period of time. As shown in FIG. 2A, at t1, a host 122 calls for participants 116 by announcing details of winning parties including number and contents of awards. Then participants 116 apply for the awards, as shown in the solid arrows, until t2 when the host 122 announces the closing of the entries. Subsequently, the host 122 makes a selection and announces the winners of the lottery, as shown in the broken line arrow. In this conventional method, the participants 116 could not know who won the prizes for a certain period of time. In the conventional method, many people hesitated to participate in the prize competition because of the time consuming process.

Further under this conventional method, it was difficult for the host 122 or server to limit number of participants 116, particularly in the case of an Internet lottery. This problem is explained in reference to FIG. 2B. As shown in FIG. 2B, any Internet user may access to a lottery home page or web site 124 and may basically participate in the prize competition 116 specified in the web site 124. Each of the participants 116 enters specific data requested into the database 126 which constitutes a main group. A host 122 of the prize competition could not manipulate or control the attributes of the main group database 126, because the database 126 was not well organized. Therefore the database of the main group thus constituted was not necessarily effective for the operation of the Internet lottery.

SUMMARY OF THE INVENTION

The object of the present invention is to provide a lottery system which is capable of solving the problems of the prize competition on the conventional Internet as discussed above.

First, it is an object of the invention to solve the problem that a certain period of time was needed until participants of a lottery could know the result of the lottery by making the lottery results available immediately. Thus, the participants can participate in the lottery more easily.

Second, it is another object of the present invention to solve the problem that the host could not limit the number of participating persons. This object is achieved by assigning an access key to a participant individually and making the system accessible only by a person holding the access key.

Another object of the present invention is to ensure that an electronic mail to which a unique access key is attached is sent to a specified user, that the user is identified by way of the access key, and that the user is informed of a result of the lottery. Thus, the users can know the result of the lottery immediately after the entry, and the host can limit the number of participants in advance.

The result of the lottery can be obtained by performing a ballot at the time of the application of the user, and the result of the lottery can also be determined prior to the sending of the foregoing electronic mail. The limitation or identification of the participants can be performed by using a destination mail address of the electronic mail, in addition to the use of the access key. The access key can be used as an address of an electronic mail to which the user responds.

The result of the lottery can be notified to participants also by informing them of a URL to another page where the results are displayed in addition to an access keyword via the electronic mail. Further, the URL to the page informing the foregoing result can be notified together with the result of the lottery, whether the participant won or lost the prize competition. In addition, participants may know as to whether they won the prize by accessing the result page by entering the foregoing access keyword and a mailing address to which the foregoing access keyword is sent at the page informing the foregoing result.

These are systems in which an electronic mail is used for applications or entries. In addition to these systems, a system may be adopted in which by using the foregoing access key informed by the electronic mail as an access keyword either in a URL of a page for application or in a specified URL, a URL informing the result of the lottery can be accessed with an accessing of the foregoing user accesses the foregoing URL. Moreover, the destination mail address of the foregoing electronic mail, which is entered in the foregoing URL, can also be used for the discrimination.

The foregoing lottery system, which collects and stores data concerning the user who applied, can be used for various kinds of systems.

A recording medium which stores a program capable of constituting a computer system by the foregoing lottery system is within the scope of the present invention.

BRIEF DESCRIPTION OF THE DRAWINGS

For a more complete understanding of the present invention and the advantages thereof, reference is now made to the following description taken in conjunction with the accompanying drawings, in which;

FIG. 3 is a view showing a lottery system of the present invention;

FIG. 4 is a flowchart showing processing in a lottery system of a first embodiment of the present invention;

DETAILED DESCRIPTION OF THE PREFERRED EMBODIMENTS

Embodiments of the present invention will be described with reference to the accompanying drawings in detail.

Figure 1:
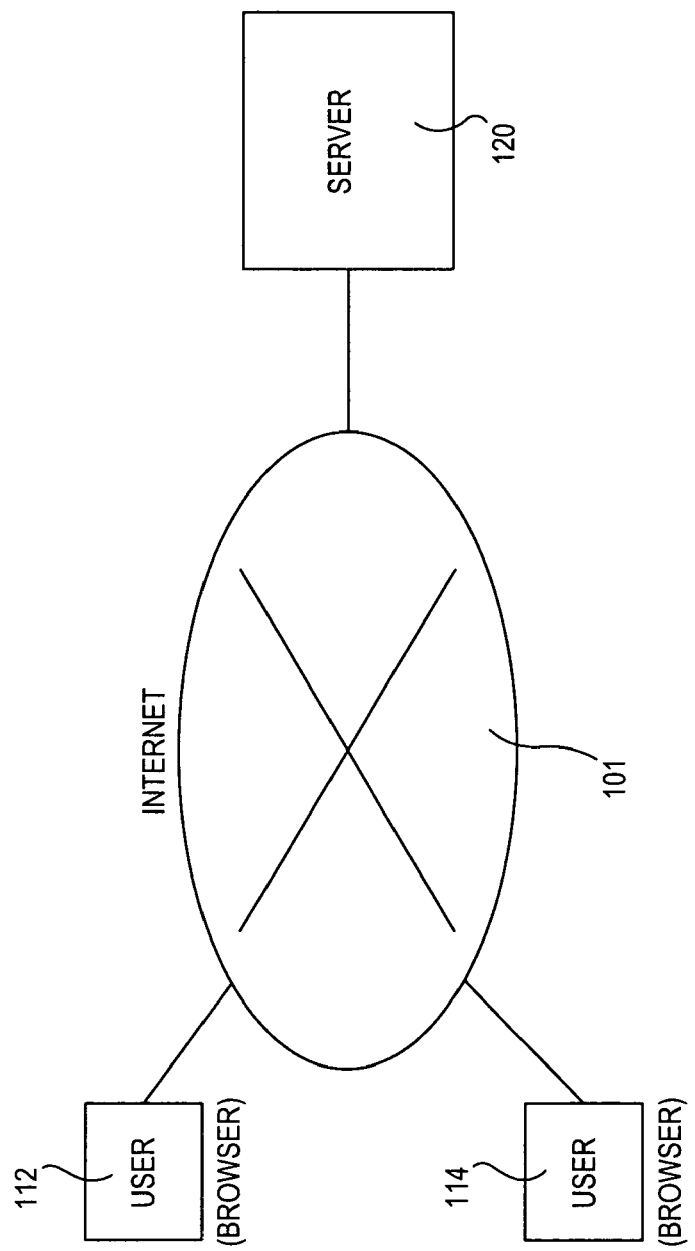
FIG. 1 is a view showing a constitution of a system on the Internet.
Figure 2A:
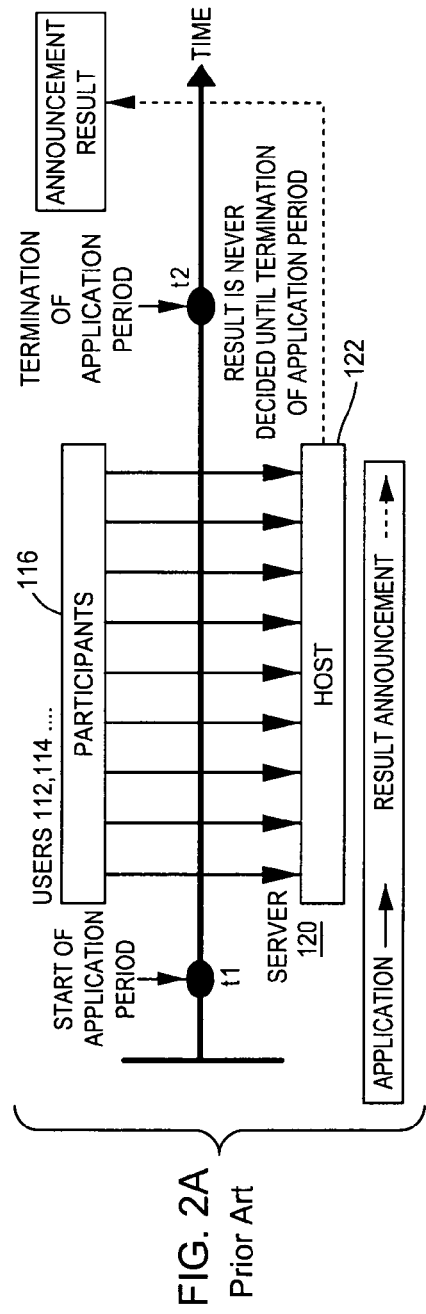
FIG. 2 is a view showing a system of a conventional lottery system.
Figure 2B:
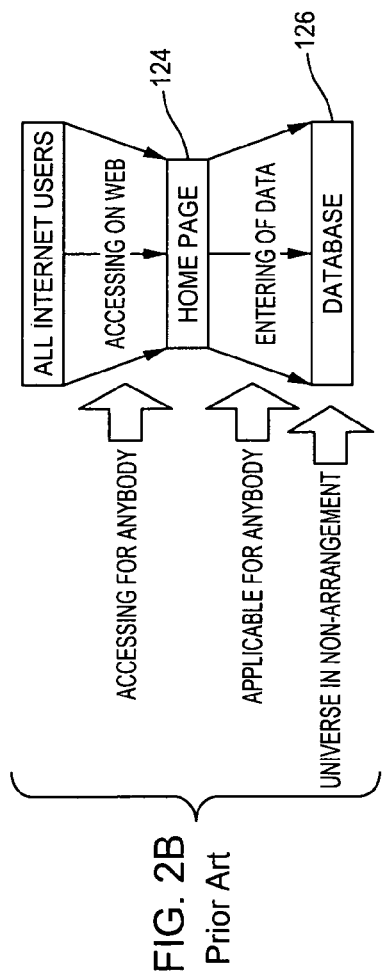

A summary of processing in the lottery system of the present invention will be explained using FIGS. 3A and 3B. FIG. 3A illustrates the way of announcing the result of the lottery in the lottery system of the present invention. As shown in FIG. 3A, at t1, a host 122 calls for participants 116 by announcing details of winning parties including number and contents of awards. Then each of participants 116 apply for the awards, as shown in the solid arrows, until t2 when the host 122 announces the closing of the applications or entries. Unlike the conventional lottery system shown in FIG. 2A, as soon as a participant 116 applies for a lottery, as shown in solid arrow, the participant 116 is informed of the result of the draw by an electronic mail and the like as shown in a broken line arrow. As described above, the interactive lottery system by which the participants 116 can know the result soon after the application for the lottery can be constructed.

Furthermore, as shown in FIG. 3B, in the lottery system of the present invention, an access key such as an ID for applying for the lottery is separately sent to each of customers and potential customers 118, who eventually become participants 116, by a host 122 of the lottery via electronic mail. Thus, participants 116 for the lottery can be limited to particular customers. When the prize competition is performed based on mail addresses of customers and potential customers, which are obtained by various kinds of ways, it will be possible to collect more accurate data in which a main group of participants can be specified. This would be less true in a conventional prize competition on the Internet. The issuing of individual keywords can increase a reply ratio from objective persons, and doing so exhibits effects for advantageous data collection.

Embodiment 1

One example of the lottery system of the present invention will be described using a process flow of the embodiment 1 shown in FIG. 4 in detail. Here, as an access key for discriminating participants 116, an ID used as a part of an electronic mail address is employed.

1. Sending Out of an Electronic Mail with an ID (S202)

In the lottery system of the present invention, a host 122 of the prize competition uses servers A and B. The host 122 first sends out an electronic mail with an ID (access key) to participants 116 by an electronic mail (S202) at server A. A person to whom this electronic mail is sent is the participant 116 in the lottery. This ID, which can be constituted by standard alphanumeric characters, is uniquely allocated to corresponding address of the electronic mail of each participant 116. This ID is a reply electronic mail address (for example, XXX@kuji.rakuten.co.jp, where XXX is ID) for applying for the lottery. The participant 116 will be participating in the lottery at the time when the participant 116 sends out a reply mail to this address.

The electronic mails containing the reply ID can be sent out simultaneously before the application period, or voluntarily during the application period.

2. Receipt of Electronic Mail with ID (S204) and Reply for Application (S206)

The participant 116 receives the electronic mail with the ID from the host 122 of the prize, respectively (S204). After the participants 116 read the respective electronic mails, they reply the electronic mails to the ID (electronic mail addresses) (S206). Thus, the participant 116 who replied the electronic mail will become eligible to win the 30 prize con petition. In the reply mail, nothing is written to the text, and the words to the effect that they want to apply for the prize competition may be written in the title or subject. However, it is not always necessary to fill in such words.

3. Discrimination of Participant 116 (S208) and Decision of Winning of Prize (S210)

The host 122 receives the electronic mail sent back from the participant 116 by an account especially provided for the ID (electronic mail address). Here, by setting this ID to a large number of digits, false application for the lottery by a person other than the participants 116 is made very difficult to get admitted into the lottery. This is true even where a person uses such devices as random number generators or a random IDs. Thus, security of the system can be strengthened. If a person other than the participant 116 applies for the lottery by a random ID, a probability that this ID is the issued one becomes very low. When the electronic mail is received with an account provided for the ID (electronic mail address), the participant corresponding to the ID is recognized as the participant 116. Moreover, based on the address of the sender, which is described in a header portion of the electronic mail received, this address is confirmed to be a destination of the electronic mail for the prize competition. Thus, by using the ID and the electronic mail address of the participant 116, the discrimination of the participant may be performed. Because the ID used for the application for the prize competition is checked at the time of the first application by a participant 116, it is impossible to apply for the prize competition plural times with the same ID.

Next, based on the probability of winning the prize, which was previously set, the winner of the prize of the participant 116 is instantaneously determined (S210). The determination of the winner of the prize is conducted in the following manner. Random numbers of predetermined figures are generated by a computer, and the winner of the prize is determined by the generated random numbers. It is decided which number among the generated random numbers is the one for winning the prize, thus enabling the free setting of the probability of winning the prize. Accordingly, it is possible to change the probability of winning the prize depending on the kinds of the prizes and sweepstakes.

Moreover, it is also possible to set the winner of the prize to plural ranks such as prize A and prize B, in addition to the winning of the prize and the losing of the prize.

Data indicating the result of the lottery is sent to a system of a web site 124 simultaneously as it is generated.

4. Sending of Electronic Mail for Confirmation (S218)

After it is decided whether the participant 116 wins the prize, the URL of the page for confirming the winning of the prize and the access keyword necessary for confirming the winning of the prize in the page of the URL are sent to the participant 116 by the electronic mail (electronic mail for confirming prizes won, S218). This access keyword is set individually for persons who win the prize and persons who lose the prize (S212, S216). However, the participant 116 cannot know the result of the lottery only by seeing the access keyword. In the case where there are a plurality of prizes for the winners of the lottery as described above, the access keyword is set so as to distinguish each prize.

5. Receipt of the Electronic Mail for Confirmation (S220) and Access to Page for Confirmation of Result (S250)

The participant 116 receives an electronic mail for confirming the result of the lottery (S220) soon after sending out an electronic mail to an ID (S206). A URL of a lottery result confirmation home page or web site 240, which is available at server B, and an access keyword to this web site 240 is written in the electronic mail (S218) sent by the host 112. When there are a plurality of prizes such as prize A and prize B, separate access keywords are prepared for the individual prizes. The lottery result data is made available at the server B by the host 112 as shown in broken line arrow.

The participant 116 accesses the URL of the lottery result confirmation web site 240 (S250), the address of which is written in the electronic mail received (S220). The participant 116 then enters the access keyword written in the electronic mail for confirming the result of the lottery and the electronic mail address of the participant 116 (S252). Thus, the participant 116 can know the result of the lottery instantly.

Here, the reason why the participant 116 enters the electronic mail address besides the access keyword is to confirm by the electronic mail address that the person who accessed the URL of the lottery result confirmation page is the participant 116 himself or herself. By entering the electronic mail address, it can be prevented that a person who knows the access keyword in some way accesses the page illegally.

6. Access to Page for Person Who Wins Prize and Page for Person Who Fails to Win Prize (S256 and S258)

As soon as the access keyword is entered by the participant (S252), the server B determines the winner and losers of a prize, and the server B allows the participant to access the respective pages (S254). Accordingly, a winning participant may access to the page for the winners of the prize (S256), and a losing participant may access to the page for the losers (S258). A winning participant is requested to enter personal information such as his or her name and address in the page for the winners of the prize (S256), and the winning participant can receive the prize (S256). In the case where plural kinds of prizes such as prize A and prize B exist, the foregoing page for the winner of the prize is prepared for each kind of the prize.

On the other hand, the losing participant may access the page for the losers (S258), and, by entering information such as his or her name and address, that person can also participate in another prize competition seeking double chance (S258). By providing the additional prize competition in which only the losing participant can participate, an incentive for offering of information is also given to the person who failed to win the prize. For example, this double chance uses the same system as that of a prize competition on the general Internet, and winners of the double chance are chosen among the participants 116 after a certain period of time, and they are informed of winning in the double chance by an electronic mail and the like.

7. Storage of Database (S260)

Since the participants 116 have to enter personal information in both pages for the winners and the losers, data relating to the winner and the loser is stored in the database on the host 122 side (S260). Such prize competition is repeatedly performed, and by analyzing data obtained by the prize competitions, an accuracy of the database increases and the database can be effectively utilized for marketing activities.

Embodiment 2

Figure 5:
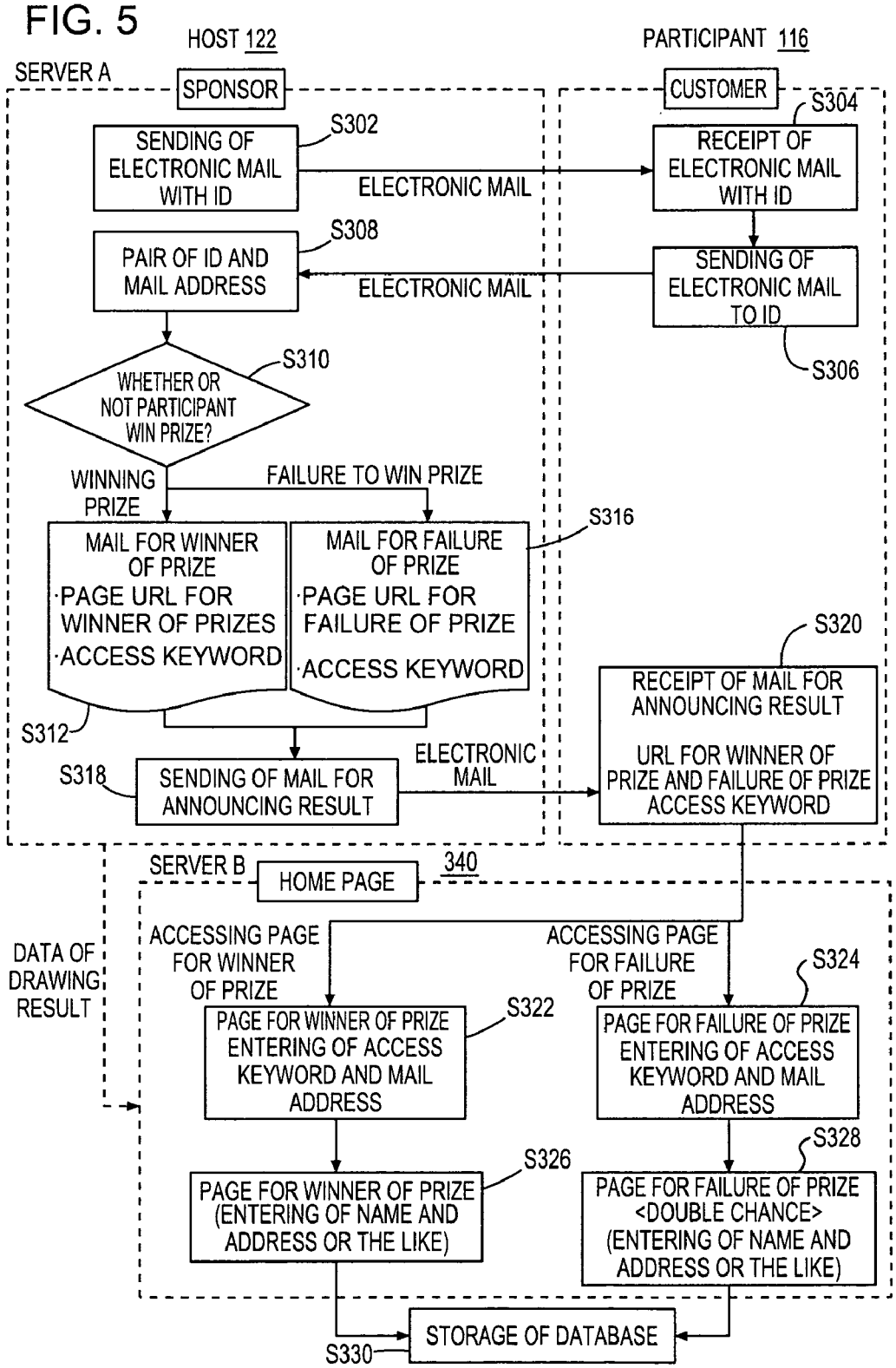
FIG. 5 is a flowchart showing processing in a lottery system of a second embodiment of the present invention.

Another embodiment of the lottery system of the present invention is shown in a flowchart of FIG. 5.

1. Transmission of Electronic Mail with ID (S302)
2. Receipt of Electronic Mail with ID (S304) and Reply to ID (S306)
3. Limitation to Participant 116 (S308) and Determination of Winner of Prize (S310)

Since the above described process steps in FIG. 5 (S302, S304, S306, S308, S310, S312, S316, S318 and S320) are similar to those performed in the process steps S202, S204, S206, S208, S210, S212, S216, S218 and S220 shown in FIG. 4 respectively, detailed descriptions for this process are omitted. Also in this embodiment, a plurality of prizes can be prepared.

4. Transmission of Electronic Mail for Announcing Result of Lottery (S318)

In the processing in step S310 of FIG. 5, which is similar to that in step S210 of FIG. 4, the result of the lottery by the participant 116 determined is instantaneously transmitted to the participant 116 by an electronic mail (S318). In this electronic nail, the result of the lottery, URLs for lottery result home page or web site 340 which include pages individually prepared depending on the result of the lottery and an access keyword are described (S312, S316). This access keyword is set for each result of the lottery, and, by entering this access keyword in each page, the participant 116 can access the page for the winner of the prize and the page for the loser of the prize, respectively. In the case where a plurality of prizes such as prize A and prize B exist, URLs of the pages for the corresponding prizes are written in the electronic mail (S318), and the individual pages may be accessed. The process in FIG. 5 is different from those of FIG. 4 in that the result of winning the prize is also reported to the participant 116 by the electronic mail for announcing the result of the lottery (S318).

5. Receipt of Electronic Mail for Announcing Result of Lottery (S320)

The participant 116 receives the electronic mail for announcing the result of the lottery (S320) immediately after sending back the electronic mail to the ID (S306). After the participant 116 confirms the result of the lottery, the participant 116 may accesses the URLs of the pages for the winners of the prize and for the losers of the prize, which are described in the electronic mail for announcing the result of the lottery (S318). Moreover, by writing the access keyword and the mail address onto the pages, where such addresses are included in the electronic mail for announcing the result of the lottery, the participant 116 can access the pages either for the winners or the losers.

6. Access to Page for Winner of Prize and Page for Loser of Prize (S322, S324)

After entering the access keyword and the mail address, the winning participant can access the page for the winners, and the losing participant can access the page for the losers (S322 and S324 respectively). The winning participant may enter personal information such as his or her name and address onto the page for the winners (S326), whereby the winning participant can receive the prize. In the case where a plurality of prizes such as prize A and prize B exist, the winning participant may access one of the pages for the respective prize, and the participant may receive the respective prize.

On the other hand, the losing participant may access the page for the losers (S324), and enter personal information such as his or her name and address (S328), whereby the losing participant can participate in another prize competition for a second chance. By providing the prize competition in which only the losing participant can participate, incentive for offering of personal information is likewise given to the losing participant. For example, this second chance uses the same system as that of a prize competition on the general Internet, and winners of the second chance are chosen among the participants 116 after a certain period of time, and they are informed of winning in the double chance by an electronic mail and the like.

7. Storage of Data (S330)

Since the participant 116 has to enter his or her personal information in both of the pages for the winners and the losers, data relating to the winner and the loser is stored in the database on the host side. Such prize competition is repeatedly performed, and by analyzing data obtained by the prize competitions, an accuracy of the database increases and the database can be effectively utilized for marketing activities.

Embodiment 3

In the above-described embodiment, the application for the lottery is performed by the electronic mail. In the embodiment, the application for the lottery is performed in a way that the participant 116 accesses the page of the URL for application. This lottery system of this embodiment will be described with reference to the flowchart shown in FIG. 6 in detail. Here, a unique URL and an access keyword are used as the access key for distinguishing the participant 116.

1. Sending of Electronic Mail with URL (S402)

In the lottery system of this embodiment, the process starts with sending the electronic mail with the URL to a participant 116 (not shown in FIG. 6) by a host 122 (not shown in FIG. 6) of the prize competition using the electronic mail (S402). With reference to this URL, there are two ways to assign such URL. The first way is to allocate this URL to the individual participant (hereinafter referred to as pattern 1). The second way is to have single fixed URL (hereinafter referred to as pattern 2).

Pattern 1

In the electronic mail sent from the host 122 to the participant, a unique URL which is allocated for each electronic address of the participant, that is, an access key for application, is written.

Pattern 2

The URL (fixed) of the prize competition page and the unique access keyword allocated for each electronic address are described in the electronic mail.

Figure 6:
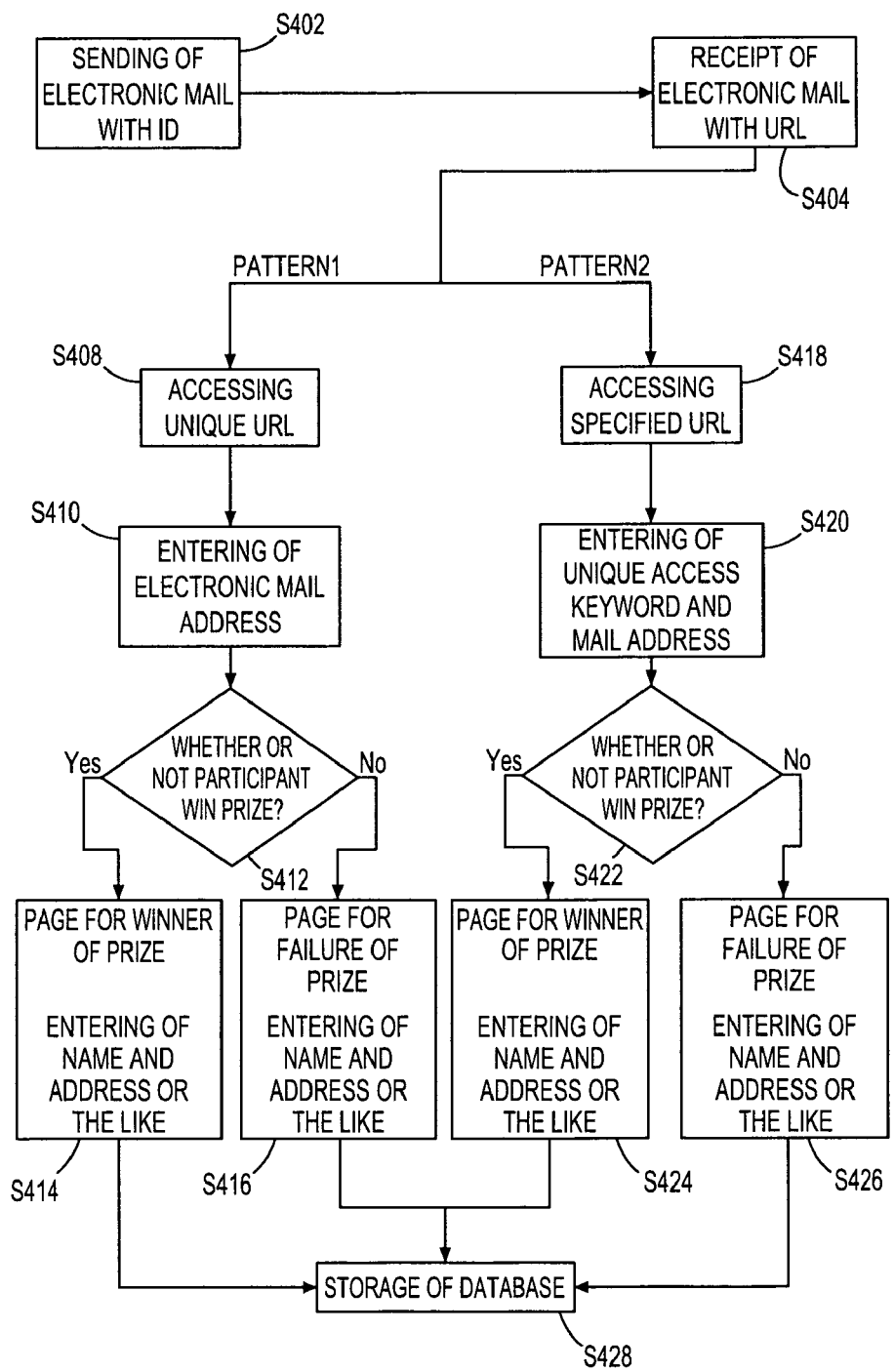
FIG. 6 is a flowchart showing processing in a lottery system of a third embodiment of the present invention.

The flowchart of FIG. 6 shows the processing when both of the patterns are simultaneously executed.

2. Receipt of Electronic Mail with URL and Access to URL (S404)

The participant receives the electronic mail with the URL sent from the host of the prize competition (S404). The participant accesses this URL, whereby the participant can first apply for the prize competition (hereinafter the participant who applied for the prize competition is called a participant).

Pattern 1

The participant 116 accesses the unique URL written in the electronic mail received by the participant (S408), whereby the individual recognition is performed and the participant can apply for the lottery. Moreover, by entering onto the page the mail address of the participant used in the electronic mail with the URL sent from the host of the prize competition (S410), the individual recognition can be performed.

Pattern 2

When a participant access a specified URL (S418), the participant has to be individually recognized, so that it is possible to recognize the participant individually at least by entering a unique keyword (S420). Moreover, by entering the unique access keyword and the mail address of the participant used in the electronic mail sent with the URL sent from the host 122, the participant 116 can also be discriminated.

3. Determination of Lottery Result (S412 and S422)

In both of the patterns 1 and 2, it is possible to individually recognize the participant based on the mail address and the access keyword which are entered onto the page. When the participant is confirmed to be a person who is eligible of the application for the prize competition, the result of the lottery is decided by a probability calculation using random numbers based on a probability of winning the prize, which has been set previously (S412 and S422). It is possible to set this probability freely, and it is possible to change the probability of winning the prize for each prize and each sweepstake.

Moreover, it is also possible to set the winner of the prize to plural ranks such as prize A and prize B, in addition to the winning the prize and the losing the prize. The participant 116 can instantaneously know the result of the lottery on the page.

4. Access to Page for Winners and Access to Page for Losers (S414, S416, S424 and S426)

After the result of the lottery is turned out, the winning participant can access the page for the winners, and the losing participant can access the page for the losers. By entering personal information such as a name and an address in the page for the winner, the winning participant can receive the prize (S414 and S424).

On the other hand, the losing participant may access the page for the losers, and enters personal information such as a name and an address, whereby the losing participant can also participate in another prize competition called for a second chance (S416 and S426). By providing the prize competition in which only the losing participant can participate, an incentive for offering of information is given to also the person who loses the prize. For example, this second chance uses the same system as that of a prize competition on the general Internet, and winners of the second chance are chosen among the participants 116 after a certain period of time, and they are informed of winning in the double chance by an electronic mail and the like.

5. Storage of Database (S428)

Since the participants 116 have to enter personal information in both of pages for the winners and the losers, data relating to the winner and the loser are stored in the database on the host side (S428). Such prize competition is repeatedly performed, and by analyzing data obtained by the prize competitions, an accuracy of the database increases and the database can be effectively utilized for marketing activities.

In the foregoing flowchart of FIG. 6, the process of the patterns 1 and 2 are simultaneously executed. However, either the processing of the pattern 1 or the processing of the pattern 2 may be executed.

Another Embodiment

In the foregoing lottery system, a selective quiz can be added to the mail optionally. In this case, access keys different depending on answers of the quiz are notified, electronic mails are sent back to different addresses depending on answers, and different URLs are accessed depending on the answers. Then, setting is conducted such that only the participants are objective of the lottery, who send back to the ID for a right answer at the time of the decision of the result of the lottery, and who access the page for the right answer.

A lottery system may be adopted, in which the drawing in the lottery is not performed at the time of the entries of the participants 116 like the foregoing lottery system, but the result of the lottery for each participant is previously decided, thus sending out the electronic mail with the access key to the participants 116. A flowchart of the process in such lottery system can be the same as those of FIGS. 4 to 6, except that the drawing in the lottery is not performed at the time of the application, and the result of the lottery previously determined for the participant is taken out after discriminating the participant.

In the foregoing FIGS. 4 and 5, the systems which send out the electronic mail for informing the lottery show the different servers, and the systems which publish the web site to be accessed after the drawing of the lottery show the different servers. However, these systems may have the same server.

Furthermore, when the application is made after termination of the application period, the lottery system of the present invention may be constituted such that an error mail and the like are sent back to the participant.

Concerning Application of Lottery System of Present Invention

The lottery system of the present invention can be applied to all of services via an electronic mail, as long as an electronic mail address of the other person is known. This is because by sensing out an electronic mail with an access key the person who receives as the other person this electronic mail can be recognized as the participant 116 for the prize competition, as long as an electronic mail address of the participant 116 is known. Concrete application examples of the lottery system of the present invention are as follows.

Mail magazines;

Mail news;

Greeting cards such as seasonal, Christmas or new year greeting cards, summer greeting cards, birthday cards, wedding cards, and new born baby celebrating cards;

Direct mails;

Confirmation of order of online shopping and shipping information mails; and

Incentive programs for purchasing goods (bonus or free gifts added to purchased goods).

The lottery system of the present invention is capable of achieving the following advantageous effects by utilizing the lottery system in various kinds of services via the foregoing electronic mail.

Increase of Ratio at which Electronic Mail is Read Out

Various kinds of information transmitted over the Internet nowadays, and a matter that customers are made to read an electronic mail distributed to them without fail has been a serious problem. The lottery system of the present invention exhibits an effect that an incentive to review the contents of the electronic mail distributed to the customers is increased by adding a unique access key capable of applying for the lottery, not simply containing information at the time of issuing the information by the electronic mail such as mail news which is distributed to customers. Although a large amount of information concerning a prize competition is published in electronic mail news and the like, the access key is personally allocated to the participant himself or herself in the lottery, and the lottery system of the present invention has a merit or advantage that the participant can know the result of the lottery instantaneously. Accordingly, the ratio at which the customer reads out the electronic mail is significantly increased compared to the conventional mere prize competition information.

Increase in Number of Accesses to Web Sites

Accompanied with an increase of a ratio at which the electronic mail is read out, there is an effect to increase the number of accesses to the web site 124. The participant 116 to the prize competition is finally required to access the URL of the host 122. For this reason, by utilizing the lottery system of the present invention, the host 122 can significantly increase the number of accesses to his or her own web site 124.

Storage of More Accurate Data

As one major object of the prize competition on the Internet, data collection of information concerning the customers is enumerated. Since the limitation of the persons who apply in the prize competition adopting the foregoing systems was difficult, it was difficult on the host 122 side to operate a universe of data, which is for collection and analysis. On the contrary, in the lottery system of the present invention, since the participant 116 can be determined on the host 122 side and it is impossible to apply for the prize competition without holding a unique access key, an illegal participant 116 can be excluded. Accordingly, the customer data obtained from the lottery system of the present invention has a specified universe, and is more accurate than data obtained in a prize competition on the conventional Internet. By utilizing this data, a marketing activity to be performed afterward becomes accurate and effective.

Obtaining of Time for which Reader Reads Mail

Since the access key in the lottery system of the present invention is allocated to each participant 116, it is possible to grasp who reads the electronic mail as well as when the electronic mail is read, by grasping the time when the mail is sent back and the access time to the URL. By utilizing this data, it can be estimated to some extent at what period of time the customers access the Internet. The estimation of the period of time can be utilized for determination of timings of transmitting information to the customer, which is to be performed afterward.

Incentive for Purchasing by Customer

A service that issues an access key of the lottery system of the present invention to a customer who purchased a specified article in an online shop is provided, whereby an incentive to purchase the article by the customer can be increased.

A program relating to the present invention is read out from a storage medium stored therein using the system and the program read out is executed, whereby the constitution of the present invention can be incorporated into a computer system. This storage medium includes a floppy disk, a CD-ROM, a magnetic tape, a ROM cassette and the like.

Moreover, the lottery system of the present invention can be embodied also in a multi-system composed of a plurality of systems, as well as in a single system.

The foregoing lottery system of the present invention is a system for a public lottery (speed lottery), a prize competition and the like, which are performed on Web, and in the lottery system the access key (electronic mail address (ID), access keyword and URL) unique for an electronic mail is issued, thus deciding the result of the lottery using the access key. By this lottery system, unlike a prize competition on the conventional Internet web site 124, the result of the lottery is instantaneously known without passage of a certain period of time, and the host 122 can limit the participant 116 for the prize competition previously.

Since the result of the lottery is instantaneously decided, the participant can participate in the prize competition more easily, and it is possible to greatly increase the ratio of the reply to the notification of the prize competition. One of the objects of the conventional prize competition commonly performed on the web site 124 is to construct the database. However, since the lottery system of the present invention is capable of limiting the persons who want to participate in the prize competition, an accuracy of the information of the database obtained from the lottery system of the present invention increases significantly compared to the conventional prize competition.

Although the preferred embodiments of the present invention have been described in detail, it should be understood that various changes, substitutions and alternations can be made therein without departing from spirit and scope of the inventions as defined by the appended claims.

The contents of Japanese patent application No. 11-247300 filed Sep. 1, 1999 including specification, drawings and claims are incorporated herein by reference in entirety.

What is claimed is:

1. A lottery system utilizing an electronic mail, comprising:
   storing means for storing information of customers;
   means for limiting the customers stored in the storing means in advance so as to specify particular participants for a lottery;
   means for uniquely allocating a reply electronic mail address to each of said specified participants, so that said reply electronic mail addresses are different from each other;
   means for sending a first electronic mail to each of said participants, in which the reply electronic mail address is affixed as a unique access key to each of said participants;
   means for recognizing an application for the lottery from each of said participants by receiving a second electronic mail sent back to said reply electronic mail address; and
   means for notifying each one of said participants who sent back the second electronic mail to the reply electronic mail address of the result of said lottery.

2. The lottery system according to claim 1, wherein the result of said lottery is obtained by a drawing performed when the participant applies for said lottery.

3. The lottery system according to claim 1, wherein the result of said lottery is previously decided before said electronic mail is sent.

4. The lottery system according to claim 1, wherein recognition of the participant for said lottery is performed based on said reply electronic mail address of each of said participants.

5. The lottery system according to claim 1, wherein the notifying means notifies the result of said lottery to each of the participants, by sending a third electronic mail in which a URL of a page informing of the result and an access keyword, are affixed, to each of the participants.

6. The lottery system according to claim 5, wherein the URL of the page informing of said result is separated into one for a win of a prize and the other for a failure in winning the prize.

7. The lottery system according to claim 5, wherein by entering said access keyword and a destination electronic mail address to which the third electronic mail is sent, into the page informing of said result, the page for the win of the prize or the page of the failure in winning the prize can be accessed.

8. A lottery system utilizing an electronic mail, comprising:
   storing means for storing information of customers;
   means for limiting the customers stored in the storing means in advance so as to specify particular participants for a lottery;
   means for uniquely allocating a keyword to be entered in a page of a URL, to each of the participants so that the keywords are different from each other;
   means for sending an electronic mail in which the keyword is affixed as a unique access key, to each of the participants;
   means for recognizing an application from each of said participants when said participant accesses the page of said URL and enters the keyword; and
   means for notifying each of said participants of the result of the lottery,
   wherein the keyword is a destination mail address of said electronic mail.

9. The lottery system according to claim 1, wherein data of said participants who applied for the lottery is collected and stored.

10. The lottery system according to claim 1, wherein said lottery system is entirely incorporated into a computer system.

11. A system for conducting a lottery, the system comprising:
   a database and a server, the server being configured to:
   store information of customers in the database;
   limit the customers stored in the database in advance so as to specify particular participants for the lottery;
   allocate uniquely a reply electronic mail address to each of said specified participants so that the reply electronic mail addresses are different from each other;
   send a first electronic mail in which the reply electronic mail address is affixed as a unique access key to each one of a plurality of said specified participants;
   recognize said specified participants for the lottery by receiving a second electronic mail sent back to said reply electronic mail address from each of said participants;
   conduct said lottery; and
   notify each one of the participants who sent back the second electronic mail of their result of said lottery.

12. A lottery system utilizing an electronic mail, comprising:
   storing means for storing information of customers;
   means for limiting the customers stored in the storing means in advance so as to specify particular participants for a lottery;
   means for uniquely allocating a URL to each of said participants so that the URLs are different from each other;
   means for sending an electronic mail in which the URL is affixed as a unique access key to each of the participants;
   means for recognizing an application from each of the participants when the participant accesses a page of the URL and enters an electronic mail address of the participant; and
   means for notifying each of said participants of the result of said lottery.

13. A lottery system utilizing an electronic mail, comprising:
   storing means for storing information of customers;
   means for limiting the customers stored in the storing means in advance so as to specify particular participants for a lottery;
   means for providing at least one electronic mail address;
   means for allocating uniquely the at least one electronic mail address to each one of the specified participants so that the electronic mail addresses are different from each other;
   means for sending by a host a first electronic mail to each one of the specified participants, wherein the uniquely allocated at least one electronic mail address is affixed to the first electronic mail;
   means for receiving a second electronic mail sent from each one of the specified participants to the uniquely allocated at least one electronic mail address, so as to recognize the participants;
   means for conducting the lottery; and
   means for notifying each one of the recognized participants who sent the second electronic mail, of a result of the lottery.

14. A system for conducting a lottery, the system comprising:
   a database and a sever, the server being configured to:
   store information of customers in the database;
   limit the customers stored in the database in advance so as to specify particular participants for the lottery;
   provide at least one electronic mail address;

allocate uniquely the at least one electronic mail address to each one of the specified participants so that the electronic mail addresses are different from each other;

send a first electronic mail to each one of the specified participants, wherein the uniquely allocated at least one electronic mail address is affixed to the first electronic mail;

receive a second electronic mail sent from each one of the specified participants to the uniquely allocated at least one electronic mail address, so as to recognize the participants;

conduct the lottery; and notify each one of the recognized participants who sent the second electronic mail, of a result of the lottery.

15. A lottery system utilizing an electronic mail comprising:

recording means for recording information concerning customers, each of which has an electronic mail address;

means for limiting the customers in advance so as to specify a main group for performing a lottery, said main group being defined by at least one of the customers;

means for issuing a unique access key to be affixed to said electronic mail address of each of said participants of said main group;

means for assigning said unique access key to said electronic mail address to generate a reply electronic mail address for the lottery after specifying said main group for the lottery;

means for recording said unique access key in association with said electronic mail address of each of said participants of said main group;

means for sending by a host a first electronic mail to said reply electronic mail address of each of said participants of said main group, in which said unique access key is affixed to said reply electronic mail address of each of said participants of said main group;

means for recognizing an application for the lottery from each of said participants by receiving a second electronic mail sent back to said reply electronic mail address;

means for distinguishing said access key with reference to said means for recording said unique access key;

means for conducting the lottery; and means for notifying each one of said participants who sent back said second electronic mail to said reply electronic mail address, of the result of said lottery.

16. The lottery system according to claim 15, wherein a result of said lottery is obtained by a drawing performed when said participant applies for the lottery.

17. The lottery system according to claim 16, wherein said drawing is performed on the basis of the number of said participants of said main group.

18. The lottery system according to claim 16, wherein said means for conducting the lottery generates random number on the basis of the number of said participants of said main group, thereby obtaining the result of said lottery.

19. The lottery system according to claim 15, wherein said lottery system further comprising means for recording a result of the lottery; wherein the result of said lottery is previously decided on the basis of the number of said participants of said main group before sending said electronic mail, and wherein said means for conducting the lottery includes means for confirming said unique access key with reference to said means for recording the result of the lottery when receiving said second electronic mail.

20. The lottery system according to claim 19, wherein said means for conducting the lottery generates random number on the basis of the number of said participants of said main group, thereby deciding the result of the lottery.

\* \* \* \* \*